United States Patent

Furuya et al.

[11] Patent Number: 5,844,060
[45] Date of Patent: Dec. 1, 1998

[54] ORGANOPOLYSILOXANE RESIN, PRODUCTION METHOD THEREOF, AND CURABLE ORGANOPOLYSILOXANE RESIN COMPOSITION USING THE SAME

[75] Inventors: Masahiro Furuya; Kenji Yamamoto; Masaaki Yamaya, all of Gunma-ken, Japan

[73] Assignee: Shin-Etsu Chemical Co., Ltd., Japan

[21] Appl. No.: 968,884

[22] Filed: Nov. 5, 1997

Related U.S. Application Data

[63] Continuation-in-part of Ser. No. 675,157, Jul. 3, 1996, abandoned.

[30] Foreign Application Priority Data

Jul. 5, 1995 [JP] Japan .................................. 7-192519
Jun. 5, 1996 [JP] Japan .................................. 8-165189

[51] Int. Cl.$^6$ ............................ C08G 77/06; C08G 77/16
[52] U.S. Cl. ............................ 528/30; 556/459; 528/10; 528/32; 528/38; 528/40; 528/41; 528/42; 524/837
[58] Field of Search ................................ 556/459; 528/10, 528/32, 30, 38, 40, 41, 42; 524/837

[56] References Cited

U.S. PATENT DOCUMENTS

| | | | |
|---|---|---|---|
| 2,508,196 | 5/1950 | Seidel et al. | 556/459 |
| 2,842,522 | 7/1958 | Frye | 260/46.5 |
| 3,361,688 | 1/1968 | Bonitz et al. | 556/459 |
| 3,489,782 | 1/1970 | Pruvost et al. | 260/448.2 |
| 3,705,205 | 12/1972 | Antonen | 556/459 |

Primary Examiner—Margaret W. Glass
Attorney, Agent, or Firm—Millen, White, Zelano & Branigan, P.C.

[57] ABSTRACT

Provided are an organopolysiloxane resin having a number average molecular weight of at least 500 and a silanol group content of at least 5 weight %, and comprising units of formula $R^1SiO_{3/2}$, wherein $R^1$ is a hydrogen atom or a monovalent substituted or unsubstituted hydrocarbon group having 1 to 18 carbon atoms, in a proportion of 30 to 100 mole %, the units of formula $R^1SiO_{3/2}$ including 30–80 mole % of one silanol group-containing units of formula $R^1Si(OH)O_{2/2}$; a production method of the aforesaid organopolysiloxane resin; and a curable organopolysiloxane resin composition comprising the aforesaid organopolysiloxane resin.

18 Claims, 2 Drawing Sheets

ORGANOPOLYSILOXANE RESIN, PRODUCTION METHOD THEREOF, AND CURABLE ORGANOPOLYSILOXANE RESIN COMPOSITION USING THE SAME

This application is a continuation-in-part of application Ser. No. 08/675,157, filed Jul. 3, 1996, now abandoned.

FIELD OF THE INVENTION

The present invention relates to an organopolysiloxane resin, a production method thereof, and a curable composition comprising such an organopolysiloxane resin which is suitable for coating and molding uses.

BACKGROUND OF THE INVENTION

Hitherto, organopolysiloxane resins have been used for paint and varnish, coating materials, binders for moldings, and so on.

Organopolysiloxane resins are roughly classified, according to the molecular weight, into two groups, (a) those having relatively low molecular weights and high silanol group contents, and (b) those having relatively high molecular weights and low silanol group contents.

The organopolysiloxane resins classified as the foregoing group (a) are produced by hydrolyzing and condensing chlorosilanes or alkoxysilanes in an alcoholic solvent of high polarity under a relatively moderate condition; as a result, their molecular weights are low and their polymerization degrees are less than 10. Therefore, these organopolysiloxane resins are combined with silica sol, and applied to a raw material of hard coat agents. As hard coat agents can form highly hard coats at low temperatures, they are used for the protection of the surface of a plastic material.

However, a silanol group is unstable in itself, and liable to form a stable siloxane linkage with a lapse of time. As a result, the condensation reaction proceeds slowly at room temperature. Accordingly, the hard coat agent using such an organopolysiloxane resin as described above has drawbacks of not only forming a coat whose hardness decreases with time, but also yielding insoluble matters having high molecular weights due to three-dimensional crosslinkage of the organopolysiloxane resin to result in the formation of a coat which is poor in elasticity and flexibility and insufficient in impact resistance.

On the other hand, the organopolysiloxane resins classified as the group (b) are produced by hydrolysing and condensing chlorosilanes or alkoxysilanes in a nonpolar solvent, such as toluene. In order to prevent a change with the lapse of time, the condensation is effected therein so that the organopolysiloxane resins obtained can have a polymerization degree of at least 10 on an average. Thus, those resins are generally called "silicone resins". As active silanol groups functioning as cross-linking sites are lost during the condensation, the proportion of silanol groups (to the resin prepared in the pure form) is lowered to 3–4 weight %. Accordingly, these organopolysiloxane resins have good silanol group stability, but their dispersibility in water is bad and their curability is poor. When a cured coat is formed from the combination of an organopolysiloxane resin of the aforesaid type with silica sol, the resultant coat tends to have relatively low hardness.

Further, there has been known a method of producing organopolysiloxanes by the hydrolysis in the absence of an organic solvent. In accordance with this method, cyclic organopolysiloxanes having a polymerization degree of 3 to 10 are obtained by the hydrolysis and subsequent condensation of dichlorosilane.

However, the foregoing method in which organopolysiloxanes are produced by carrying out the hydrolysis without solvent has a defect that its application is limited to the case of a silane having two hydrolyzable groups (D unit).

Thus there has not yet been known an organopolysiloxane resin of the type which not only has a relatively high molecular weight and a large quantity of silanol groups, but also possesses excellent storage stability and provides a highly hard coat.

SUMMARY OF THE INVENTION

A first object of the present invention is to provide an organopolysiloxane resin which has excellent storage stability, can be cured at a temperature lower than conventional organopolysiloxane resins, and can provide a coat having high hardness and excellent flexibility.

A second object of the present invention is to provide a method suitable for the production of an organopolysiloxane resin which has excellent storage stability, can be cured at a temperature lower than conventional organopolysiloxane resins, and can provide a coat having high hardness and excellent flexibility.

A third object of the present invention is to provide a curable organopolysiloxane resin composition which has high storage stability and suitabilities for coating and molding uses.

The aforesaid objects of the present invention are attained with an organopolysiloxane resin having a number average molecular weight of at least 500 and a silanol group content of at least 5 weight %, and comprising units represented by $R^1SiO_{3/2}$, wherein $R^1$ is a hydrogen atom or a monovalent substituted or unsubstituted hydrocarbon group having 1 to 18 carbon atoms, in a proportion of 30 to 100 mole %, the $R^1SiO_{3/2}$ units including 30–80 mole % of one silanol group-containing units of formula, $R^1Si(OH)O_{2/2}$; a production method of the aforesaid organopolysiloxane resin; and a curable organopolysiloxane resin composition comprising the aforesaid organopolysiloxane resin.

DETAILED DESCRIPTION OF THE INVENTION

Specific examples of $R^1$ in the $R^1SiO_{3/2}$ units constituting the present organopolysiloxane resin include a hydrogen atom; alkyl groups, such as methyl, ethyl, propyl, butyl, hexyl, decyl and octadecyl groups; alkenyl groups, such as vinyl and allyl groups; cycloalkyl groups, such as a cyclohexyl group; an aryl groups, such as phenyl and tolyl groups; groups formed by substituting halogens for a part or all of the hydrogen atoms attached directly to carbon atoms in the above-recited groups, such as trifluoropropyl, perfluorobutylethyl, perfluorooctylethyl, γ-chloropropyl and β-chloromethylphenylethyl groups; groups substituted with epoxy functional groups, such as γ-glycidyloxypropyl, β-(3,4-epoxycyclohexyl)-ethyl, 5,6-epoxyhexyl and 9,10-epoxydecyl groups; amino-substituted groups, such as γ-aminopropyl, N-(2-aminoethyl)-aminopropyl, N-phenylaminopropyl and dibutylaminopropyl groups;

groups substituted with (meth)acrylic functional groups, such as γ-methacryloxypropyl and γ-acryloxypropyl groups; groups substituted with sulfur-containing functional groups, such as γ-mercaptopropyl and β-(4-mercaptomethylphenyl) ethyl groups; groups substituted with alkyl ether groups, such as polyoxyethyleneoxypropyl group; groups substituted with carboxyl groups, such as γ-hydroxycarbonylpropyl group; and groups substituted with quaternary ammonium salts, such as γ-tributylammonium propyl group.

In particular, it is preferable for $R^1$ to be an alkyl group when the present organopolysiloxane resin is used for the purpose of answering weather-resistance requirements; while an epoxy functional group is preferred as $R^1$ when scratching resistance, flexibility and dyeing capability are required for coats formed from the present organopolysiloxane resin.

The present organopolysiloxane resin is required to comprise the units of formula $R^1SiO_{3/2}$ in a proportion of 30–100 mole %, preferably 40–100 mole %. When the proportion of $R^1SiO_{3/2}$ units is less than 30 mole %, the resultant resin has poor curability and low cross-linking degree, so that it tends to form a coat having low hardness.

Specific examples of a $R^1SiO_{3/2}$ unit are the unit of formula (1), the unit of formula (2) and the unit of formula (3) illustrated below:

In addition to the units of formula $R^1SiO_{3/2}$, the present organopolysiloxane resin may comprise Q-units of formula $SiO_{4/2}$ and D-units of formula $R^1R^2SiO_{2/2}$ (wherein $R^1$ has the same meaning as in the $R^1SiO_{3/2}$ units, and $R^2$ is an alkyl group containing 1 to 6 carbon atoms).

In order to obtain a cured coat having higher hardness, it is desirable that Q-units of formula $SiO_{4/2}$ be introduced into the present organopolysiloxane resin; while it is desirable for the present organopolysiloxane resin to comprise D-units of formula $R^1R^2SiO_{2/2}$ in order to further acquire pliability in the cured coat formed therefrom. In addition, the present organopolysiloxane resin may comprise a small proportion of M-units of formula $R^1{}_3SiO_{1/2}$ (wherein $R^1$ has the same meaning as in the $R^1SiO_{3/2}$ units).

For the present organopolysiloxane resin, it is further required that 30–80 mole %, preferably 35–70 mole %, of the units of formula $R^1SiO_{3/2}$ be one silanol group-containing units of formula $R^1Si(OH)O_{2/2}$. When the proportion of one silanol group-containing units is lower than 30 mole %, the cured coat obtained is insufficient in hardness; while when the proportion is higher than 80 mole %, the cured coat cannot have sufficient storage stability and flexibility.

Further, the silanol group content in each molecule of the present organopolysiloxane resin is required to be at least 5 weight %, preferably at least 7 weight %, because a cured coat having high hardness cannot be formed when the resin has a silanol group content lower than 5 weight %.

Furthermore, the present organopolysiloxane resin is required to have a number average molecular weight of at least 500, preferably at least 600, and particularly preferably from 1,000 to 10,000. When the number average molecular weight is less than 500, the resultant resin has an unstable structure, so that it has poor storage stability and cannot form a cured coat having sufficient flexibility.

Additionally, the number average molecular weight can be determined by gel permeation chromatography (GPC).

The present organopolysiloxane resin can be produced using a method comprising (1) a step of hydrolyzing an organosilicon compound represented by $R^1SiX_3$ (wherein $R^1$ has the same meaning as defined above, and X represents a hydrolyzable group) in a water solution having a pH value of 1–7, (2) a step of conducting the condensation reaction of the hydrolyzed organosilicon compound in the layer containing water as a main component, and (3) a step of isolating the thus produced organopolysiloxane resin from the reaction system.

Examples of a hydrolyzable group represented by X include halogen atoms, such as chlorine and bromine atoms; alkoxy groups, such as methoxy, ethoxy, butoxy and isopropoxy groups; acyloxy groups, such as acetoxy group; and amino groups. Of these groups, alkoxy groups are preferred over the others in the present invention.

Specific examples of an organosilicon compound which can be used include methyltrimethoxysilane, methyltriethoxysilane, methyltriisopropoxysilane, methyltributoxysilane, methyltriisopropenoxysilane, methyltriacetoxysilane, methyltrichlorosilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, hexyltrimethoxysilane, decyltrimethoxysilane, octadecyltrimethoxysilane, vinyltrimethoxysilane, vinyltriethoxysilane, 5-hexenyltrimethoxysilane, phenyltrimethoxysilane, phenyltriethoxysilane, phenyltrichlorosilane, γ-glycidoxypropyltrimethoxysilane, γ-glycidoxypropyltriethoxysilane, γ-(meth)acryloxypropyltrimethoxysilane, γ-(meth)acryloxypropyltriethoxysilane, γ-aminopropyltrimethoxysilane, γ-aminopropyltriethoxysilane, γ-mercaptopropyltrimethoxysilane, and γ-mercaptopropyltriethoxysilane.

In producing the present organopolysiloxane resin, at least one of the above-recited organosilicon compounds is hydrolyzed in a water solution the pH of which ranges between 1 and 7, preferably 2 and 6, particularly preferably 2 and 5.

Therein, the water solution may contain an organic solvent in a concentration lower than 10 weight %, but it is preferable for the water solution to contain no organic solvent.

This is because the number average molecular weight of the organopolysiloxane resin obtained tends to become lower the higher the water solution used is in organic solvent concentration.

So far as the present organopolysiloxane resin contains the $R^1SiO_{3/2}$ units in a proportion of from 30 to 100 mole %, it may further contain $R^1_2SiO_{2/2}$ units and $SiO_{4/2}$. Accordingly, the aforementioned hydrolysis reaction may be carried out in the presence of an organosilicon compound containing two hydrolyzable groups as represented by $R^1_2SiX_2$, an organo-silicon compound containing four hydrolyzable groups as represented by $SiX_4$ and an organo-silicon compound containing one hydrolyzable group as represented by $R^1_3SiX$.

In the hydrolysis as the step (1), it is desirable that 10–500 parts by weight of water be present per 10 parts by weight of organosilicon compound(s) used. In particular, the presence of 10–200 parts by weight of water is advantageous. When the amount of water used is less than 10 parts by weight, it often happens that the units represented by $R^1Si(OH)O_{2/2}$ does not reach a proportion of at least 30 mole %; while, when it is greater than 500 parts by weight, the speed of condensation reaction becomes too low.

Although the hydrolysis reaction may be carried out in water, it is desirable for acceleration of the hydrolysis to perform the reaction in water containing a hydrolysis catalyst, such as hydrogen fluoride, hydrochloric acid, nitric acid, acetic acid, maleic acid, methanesulfonic acid and an ion exchange resin having carboxylic or sulfonic acid groups at the surface.

As for the amount of a hydrolysis catalyst, it is desirable that the hydrolysis catalyst be used in a proportion of 0.001 t 10 mole % to 1 mole of hydrolyzable groups attached to silicon atoms. In addition, the pH of such a water solution is required to range between 1 and 7. This is because the stability of silanol group is very low when the pH is lower than 1 or higher than 7.

Since the hydrolysis is apt to be accompanied with generation of some heat, it is desirable to perform the hydrolysis reaction as the reaction system is cooled with water or ice.

In the step (2) of the present method, a hydrolyzed organosilicon compound undergoes a condensation reaction. This condensation step may be performed in succession to the hydrolysis step. In general, the condensation reaction is carried out at room temperature or under heating to a temperature lower than 80° C. When the condensation is carried out at room temperature, condensates having a molecular weight of at least 500 can be obtained by running the reaction for at least 3–4 hours; while, when the condensation is carried out at a temperature close to 80° C., the aforesaid condensates can be obtained by running the reaction for at least 1–2 hours.

Condensation temperatures higher than 80° C. are undesirable because gelation tends to occur under such temperatures. When an alkoxysilane is used as a starting material, on the other hand, the condensation reaction can be accelerated if the alcohol or the alcohol-water mixture produced by hydrolysis is distilled away by running the condensation reaction at a temperature lower than 80° C. under reduced pressure of 20–100 mmHg.

The thus obtained hydrolytic condensation product of an organosilicon compound has properties depending on the species of the organic substituent group $R^1$ attached to a silicon atom. For instance, when $R^1$ is a hydrophilic substituent group, such as a γ-glycidyloxypropyl group, the condensation product obtained is dissolved in the resultant solution because of high affinity of the substituent group for water, and so a homogeneous transparent solution containing the present organopolysiloxane resin can be obtained.

When $R^1$ is a hydrophobic substituent group, such as a methyl group, on the other hand, the solubility of the product in water becomes lower and lower with the progress of condensation, so that the reaction solution gradually becomes slightly or appreciably cloudy. This cloudy solution is separated into two layers by being allowed to stand for a while. The upper layer is a layer containing a water-alcohol mixture having a low silicone content (generally lower than 5%), and the lower layer is a layer containing the present viscous organopolysiloxane resin and a small amount of water or an alcohol.

Even when $R^1$ is a hydrophilic substituent group, the intended organopolysiloxane resin may be obtained in the form of precipitate by making a little more progress in the condensation by means of heating or the like so that the product has a higher molecular weight. As for the method of isolating the present organopolysiloxane resin from the solution separated into two layers, there can be adopted the method in which the organopolysiloxane resin as a precipitate is separated and then dissolved again in an organic solvent, or the method in which the resin is isolated by the extraction with an organic solvent slightly soluble in water.

In the former method, there is a fear that the organopolysiloxane in the lower layer is gradually cured in the air to cause an increase in viscosity. However, the latter method, wherein the organopolysiloxane is dissolved in an organic solvent, is free from such a fear. Accordingly, the latter method is preferable to the former.

Organic solvents suitable for redissolving the foregoing viscous matter are the solvents containing as main component organic polar solvents which can dissolve organopolysiloxanes in high concentrations.

Specific examples of such an organic polar solvent include ketones, such as acetone and methyl isobutyl ketone (MIBK); ethers, such as diethyl ether, butyl cellosolve and THF; and alcohols, such as ethanol, isopropyl alcohol and butanol. In particular, methyl isobutyl ketone and/or t-butyl alcohol is preferred over the others.

As for the organic solvent which can dissolve organopolysiloxanes in a high concentration and is slightly soluble in water, suitably used solvents are organic solvents which have not only high polarity but also very low solubility in water. Specific examples of such an organic solvent include methyl isobutyl ketone (MIBK), dipropyl ether, dibutyl ether and 1-pentanol.

In addition, a nonpolar solvent, such as toluene, can be used together with a polar solvent as recited above with the intention of improvement in separation from the water layer.

From viewpoints of workability and safety, it is preferable to use methyl isobutyl ketone, an alcohol, such as 1-pentanol, or a mixed solvent, such as a toluene-butanol mixture or a toluene-pentanol mixture.

The thus obtained organopolysiloxane resin has high storage stability and low-temperature curability, and the cured matter thereof has excellent bending resistance, cracking resistance and softness. As the present organopolysiloxane resin can therefore form a coat of high hardness, it is useful for curable organopolysiloxane resin compositions, especially a coating agent and a molding composition.

The curable organopolysiloxane resin composition of the present invention is a composition prepared by diluting the present organopolysiloxane resin with water and/or an organic solvent, or dissolving the present organopolysiloxane resin in water and/or an organic solvent.

Suitable examples of such an organic solvent include ketones, such as methyl ethyl ketone (MEK), methyl isobutyl ketone (MIBK) and acetone; alcohols, such as methanol, ethanol, isopropyl alcohol, n-butanol, isobutanol, t-butanol, t-amyl alcohol, butyl cellosolve, 3-methyl-3-methoxybutanol and diacetone alcohol (DAA); ethers, such as propylene glycol monomethyl ether, dipropylene glycol monomethyl ether and diisopropyl ether; and esters such as ethyl acetate and isobutyl acetate.

When the composition is used as a molding composition, the organopolysiloxane resin concentration therein is appropriately from 20 to 75 weight %; while, when it is intended for coating use, the concentration ranging from 10 to 50 weight % is appropriate.

Further, it is desirable that a curing catalyst be added to the curable organopolysiloxane resin composition. Suitable examples of a curing catalyst include basic compounds, such as lithium hydroxide, sodium hydroxide, potassium hydroxide, sodium methylate, sodium acetate, sodium formate, n-hexylamine, tributylamine and diazabicycloundecene; metal-containing compounds, such as tetraisopropyl titanate, tetrabutyl titanate, aluminum triisobutoxide, aluminum triisopropoxide, aluminum acetylacetonate, aluminum perchlorate, cobalt octylate, cobalt acetylacetonate, zinc octylate, zinc acetylacetonate, iron acetylacetonate, tin acetylacetonate and dibutyltin laurylate; and acidic compounds, such as p-toluenesulfonic acid and trichloroacetic acid.

The amount of a curing catalyst added is appropriately from 0.01 to 10 parts by weight per 100 parts by weight of the organopolysiloxane resin.

In preparing a coating composition, it is desirable that fine grains of a metal oxide be further added for the purposes of enhancing hardness and scratching resistance of the resultant cured coat, and further imparting optical functions, such as a high refractive index, to the resultant cured coat.

The metal oxides used for imparting higher hardness and other desirable functions to a cured coat have no particular restrictions as to their grain shape and average grain size. When they are used in a coating composition, however, it is desirable for them to be small in grain size, because they can ensure the formation of a coat of high transparency. Also, the fine grains constituted of two or more different metal oxides may have any conjugation form. Specific examples of such a metal oxide include silica, alumina, titanium oxide ($TiO_2$), cerium oxide ($CeO_2$), tin oxide ($SnO_2$), zirconium oxide ($ZrO_2$), antimony oxide ($Sb_2O_5$), iron oxide ($Fe_2O_3$), iron oxide- or zirconium oxide-doped titanium oxide, the oxides of rare earth metals, mixtures of two or more of the above-recited oxides, and compound oxides constituted of two or more of the above-cited oxides. However, the metal oxides usable in the present invention should not be construed as being limited to those examples.

In adding those metal oxides, the colloidal dispersions thereof may be used, or the powders thereof may be directly dispersed into the organopolysiloxane resin solution.

In cases where the addition of metal oxides is intended for imparting scratching resistance to the coating agent, the use of silica is preferred in particular.

The amount of such metal oxides added as fillers is preferably from 50 to 300 parts by weight per 100 parts by weight of the organopolysiloxane resin.

As for the solvent, on the other hand, polar organic solvents are used to advantage. In particular, water, a lower alcohols, such as methanol, ethanol, isopropyl alcohol, n-butanol or isobutanol, methyl ethyl ketone (MEK), methyl isobutyl ketone (MIBK) and dimethylformamide (DMF) are suitably used because of their high stability in sol state and easy acquisition.

In order to further heighten the stability of silanol groups, the pH of the organopolysiloxane resin composition may be adjusted to the range of 3 to 6 by the addition of a pH regulator. As such a pH regulator, buffers for the adjustment of pH, namely the combination of an acid with a basic compound, such as the combination of acetic acid with sodium acetate or the combination of disodium hydrogen phosphate with citric acid, may be added. In addition, organic resins, pigments, dyes, leveling agents, ultraviolet absorbents, storage stabilizers and so on can be added for the purpose of imparting excellent properties to the cured coat.

In forming a cured coat by the use of a coating composition according to the present invention, the present organopolysiloxane resin is admixed with a diluent, a curing catalyst and other additives to prepare a coating composition, and the coating composition obtained is applied to a substrate and then cured by air-dry or heating. The appropriate thickness of the cured coat is from 0.05 to 70 $\mu$m.

The substrate to be used therein has no particular restriction. Specific examples thereof include plastic moldings, wood articles, and products of ceramics, glass, metal or the composite material of two or more thereof. The application to such a substrate can be performed using any of known coating methods, including a spray coating method, a roll coating method, a dip coating method, a spin coating method and so on.

The curing of the coat may be effected by standing the coat in air, or by heating the coat. The heating temperature and time for the curing, though they are not particularly limited, are chosen from the range between room temperature and 250° C. and the range of 10 minutes to 2 hours, respectively.

In cases where the present organopolysiloxane resin solution is used for molding compositions, conventional inorganic and organic materials, various fillers and reinforcers can be added thereto. The molding compositions thus obtained are molded by heating to form composite materials having high hardness and excellent heat resistance.

Specific examples of an inorganic material which can be used therein include silica, mica and glass fiber, and those of an organic material include polyimide, polyamide, a phenol resin and a silicon carbide resin. In addition, natural pulp fibers, such as cellulose derivatives, can be used because they enable the curing at lower temperatures. As for the filler, diatomaceous earth, cashew dust, calcium carbonate and rubber dust are suitable examples thereof.

Since the present organopolysiloxane is a resin having a number average molecular weight of at least 500 and a silanol-group content of at least 5 weight %, and comprising 30–100 mole % of $R_1SiO_{3/2}$ units, wherein 30–80 mole % of the $R^1SiO_{3/2}$ units is one silanol group-containing units represented by $R^1Si(OH)O_{2/2}$, it is advantageously used as the curable organopolysiloxane for coating and molding uses.

Although the organopolysiloxane of the present invention has silanol groups in a large proportion, a proper portion of the silanol groups are present in the units represented by $R^1Si(OH)O_{2/2}$, so that the present organopolysiloxane resin not only can have high storage stability and low-temperature curability but also can provide a cured coat having high hardness and excellent flexibility.

The present invention will now be illustrated in greater detail by reference to the following examples. However, the invention should not be construed as being limited to these examples.

EXAMPLE 1

Methyltrimethoxysilane in an amount of 408 g (3.0 moles) was placed in a 2-liter flask, and thereto 800 g of water was added at a temperature lower than 10° C., followed by thorough mixing of them. Then, the hydrolysis of the silane was carried out by adding dropwise thereto 216 g (12.0 moles) of a 0.05N water solution of hydrochloric acid over a 40-minute period while cooling the resultant solution with an ice bath. After the conclusion of the addition, the stirring of the reaction mixture was continued for one hour at a temperature lower than 10° C. and further for 3 hours at room temperature, thereby completing the hydrolysis.

Thereafter, the methanol produced by the hydrolysis was evaporated for removal at 70° C. for one hour under a reduced pressure of 60 mmHg. Thus, 1136 g of a solution was obtained. The solution obtained was cloudy, and it was separated into two layers by one-night standing. The lower layer was a siloxane resin which got insoluble in water and precipitated. To the hydrolysis products, 469 g of methyl isobutyl ketone (MIBK) was added and stirred for 1 hour at room temperature. Thus, the precipitated siloxane resin was dissolved completely in MIBK.

The resultant solution was transferred to a separating funnel and allowed to stand; as a result, it was separated into the water layer and the MIBK layer. The water layer as a lower layer was removed, and 668 g of a colorless transparent solution of organopolysiloxane resin (Siloxane Resin A) was obtained. This solution had a solids content of 30.2% (105° C./3 hr). It was confirmed by GPC measurement that the thus obtained organopolysiloxane resin (Siloxane Resin A) had a number average molecular weight of $1.8 \times 10^3$, and a molecular weight distribution (expressed in terms of Mw/Mn).of 3.0.

Figure 1:
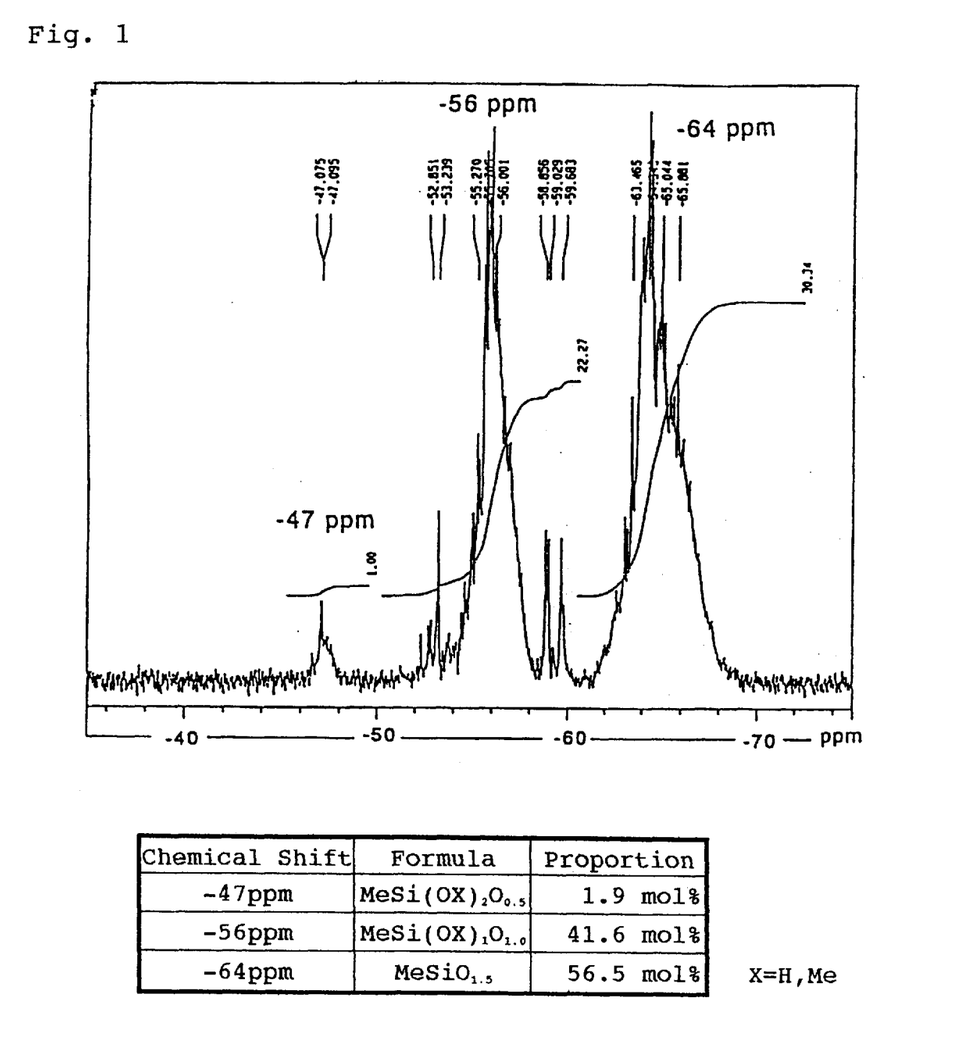
FIG. 1 is a $^{29}Si$ NMR spectrum of the organopolysiloxane resin A produced in Example 1 of the present invention.

The structure of Siloxane Resin A was examined by $^{29}$Si-NMR measurement. As a result of it, three broad signals as shown in FIG. 1 were observed. The chemical shift values of these three signals were (1) δ=−46~−48 ppm, (2) δ=−54~−58 ppm and (3) δ=−62~−68 ppm, and assigned to the constitutional units represented by the following formulae (IV), (V) and (VI) respectively:

Additionally, each OX group in the above formulae (IV) and (V) is a hydroxyl group or a residual methoxy group, and the siloxy groups in the above formula (VI) are substituents for all the OX groups.

According to the calculation based on the signal intensities, the ratio of the constitutional unit of formula (IV) to that of formula (V) to that of formula (VI) was 1.9:41.6:56.5 by mole.

In order to examine whether or not the alkoxy groups remaining unhydrolyzed were present in Siloxane Resin A, a thin coat was formed by applying the resin solution obtained above to a NaCl disk and drying it in air for 30 minutes, and then its IR spectrum (shown in FIG. 2) was measured. Therein, an intense and broad absorption band attributable to silanol groups was observed in the vicinity of 3,200 cm$^{-1}$.

Figure 2:
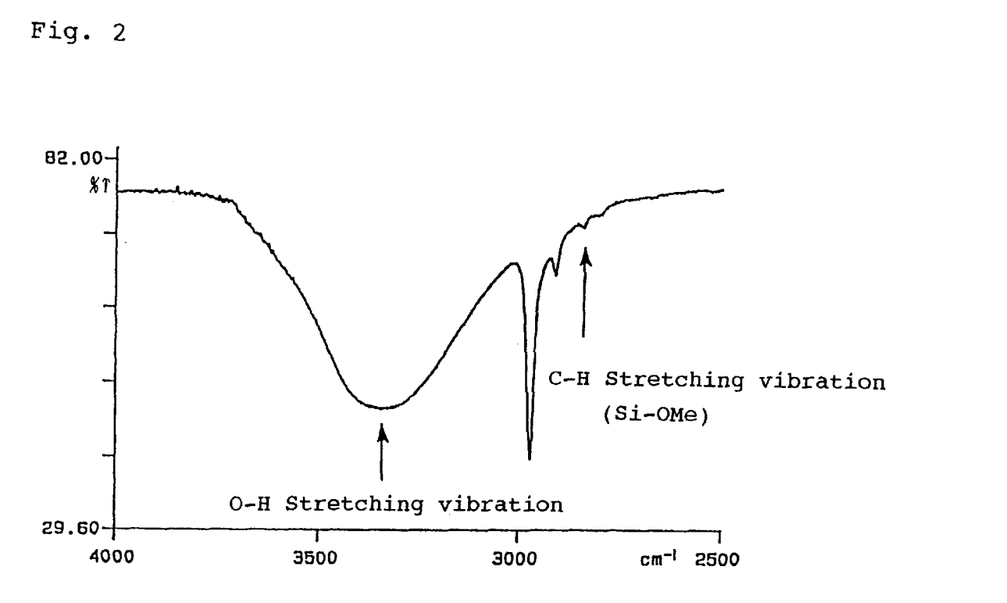
FIG. 2 is an IR spectrum of the organopolysiloxane resin A produced in Example 1 of the present invention.

As for the absorption band by the stretching vibration of C—H bonds in methoxy groups, on the other hand, it was not observed in the IR spectrum although it would be observed in the vicinity of 2,840 cm$^{-1}$ if methoxy groups remained in the resin. Further, the resin solution was subjected to a cracking treatment by heating under a strong alkaline condition, and quantitative analysis of methanol presumed to be distilled away therefrom was tried by gas chromatography. However, no methanol was detected thereby. Since, as mentioned above, no peak ascribed to methoxy groups was observed in the IR spectrum, it was concluded that the proportion of remaining methoxy groups was so small as to be below the detectable limit, and so almost 100% of the X moieties were replaced by hydrogen atoms.

As described above, the resin A was constituted of 1.9 mole % of T-1 units (formula (IV)), 41.6 mole % of T-2 units (formula (V)) and 56.5 mole % of T-3 units (formula (VI)). Accordingly, the silanol content was calculated to be 10.8 weight %. Further, this soloxane resin solution was admixed with toluene, and dehydrated completely by azeotropic distillation. The silanol content in the solution obtained was determined by Grignard method. The thus determined silanol content was 11.1 weight %, and agreed well with the value calculated from the $^{29}$Si-NMR data.

As a result of the examinations described above, the average compositional formula of Siloxane Resin A can be represented by $(CH_3)_{1.0}Si(OH)_{0.45}O_{1.28}$.

EXAMPLE 2

Methyltrimethoxysilane in an amount of 306 g (2.25 moles) and dimethyldimethoxysilane in an amount of 90 g (0.75 mole) were placed in a 2-liter flask, and thereto 800 g of water was added at a temperature lower than 10° C., followed by thorough mixing of them. Then, the hydrolysis of the silanes was carried out by adding dropwise thereto 198 g (11.0 moles) of a 0.05N water solution of hydrochloric acid over a 20-minute period while cooling the resultant solution with an ice bath. After the conclusion of the addition, the reaction solution was subject to the same processing as in Example 1, and finally diluted with MIBK to yield 694.4 g of a colorless transparent solution of Siloxane Resin B. The solids content in this solution was 29.7 weight %.

The Siloxane Resin B obtained had a number average molecular weight (Mn) of $1.5 \times 10^3$, and the total $R^1SiO_{3/2}$ units therein were constituted of 2.2 mole % of T-1 units, 39 mole % of T-2 units and 58.8 mole % of T-3 units. As for the D units originated from the dimethoxysilane used, the resin comprised the D units constituted of 1.0 mole % of D-1 units (formula (VII)) and 98.9 mole % of D-2 units (formula (VIII)).

From these data, the silanol content therein was calculated to be 7.8 weight %. Additionally, the proportion of remaining methoxy groups was below the detectable limit.

As a result of the examinations described above, the average compositional formula of Siloxane Resin B can be represented by $(CH_3)_{1.25}Si(OH)_{0.33}O_{1.21}$.

EXAMPLE 3

Into a 2-liter flask in which 800 g of water and 221.4 g (12.3 moles) of a 0.05N water solution of hydrochloric acid were placed and cooled to a temperature of below 10° C., 459 g (2.8 moles) of n-propyltrimethoxysilane and 30.4 g (0.2 mole) of tetramethoxysilane were dropped over a 30-minute period. The resultant mixture was stirred for 40 minutes at a temperature of below 10° C., and further for 5 hours at room temperature. The thus obtained hydrolysis product solution was subjected to the same processing as in Example 1, and finally diluted with MIBK to yield 865 g of a colorless transparent solution of Siloxane Resin C. The solids content in this solution was 32.1 weight %.

The Siloxane Resin C obtained had a number average molecular weight (Mn) of $2.1 \times 10^3$, and the total $R^1SiO_{3/2}$ units therein were constituted of 0.9 mole % of T-1 units, 42 mole % of T-2 units and 57.1 mole % of T-3 units. As for the Q units originated from the tetramethoxysilane used, the resin comprised the Q units constituted of 35 mole % of Q-2 units (formula (IX)) and 65 mole % of Q-3 units (formula (X)).

Additionally, the proportion of remaining methoxy groups was below the detectable limit.

As a result of the examinations described above, the average compositional formula of Siloxane Resin C can be represented by $(CH_3CH_2CH_2)_{0.93}Si(OH)_{0.50}O_{1.29}$.

EXAMPLE 4

In a 5-liter flask was placed 708 g (3.0 moles) of γ-glycidoxypropyltrimethoxysilane. Thereto, 746 g of water was added at a temperature of below 10° C., and then thoroughly stirred. Then, the hydrolysis of the silane was carried out by adding dropwise thereto 216 g (12.0 moles) of a 0.05N water solution of hydrochloric acid over a 30-minute period. After the conclusion of the addition, the stirring of the reaction mixture was continued for 40 minutes at a temperature of below 10° C. and further for 6 hours at room temperature, thereby completing the hydrolysis. Thus, 1664 g of a colorless transparent solution of Siloxane Resin D was obtained. The solids content therein was 30.1 weight %.

The Siloxane Resin D obtained had a number average molecular weight (Mn) of $1.1 \times 10^3$, and the total $R^1SiO_{3/2}$ units therein comprised 4 mole % of T-1 units and 54 mole % of T-2 units. The proportion of remaining methoxy groups were determined to be 1.4 weight % by the IR spectrum measurement. As these examination results, the average compositional formula of Siloxane Resin D can be represented by $RSi(OCH_3)_{0.08}(OH)_{0.54}O_{1.19}$, wherein R is a γ-glycidoxypropyl group.

COMPARATIVE EXAMPLE 1

In a 2-liter flask, 408 g (3.0 moles) of methyltrimethoxysilane and 200 g of methanol were placed, and cooled to a temperature of below 10° C. Thereto, 216 g (12.0 moles) of a 0.05N of dilute aqueous solution of hydrochloric acid was added dropwise over a period of 30 minutes. The resultant mixture was stirred for 40 minutes at a temperature of below 10° C. and further for 6 hours at room temperature, while maintaining the inside temperature below 10° C., thereby completing the hydrolysis reaction. Then, the methanol was removed from the reaction system by 1-hour distillation at 45°–50° C. under the reduced pressure of 30 mmHg. Thus, 652 g of a colorless transparent solution of Siloxane Resin E was obtained, and the solids content therein was 30.8% (105° C./3 hr).

The Siloxane Resin E obtained had a number average molecular weight (Mn) of $4.2 \times 10^2$, and the total $R^1SiO_{3/2}$ units therein comprised 6 mole % of T-1 units and 32 mole % of T-2 units. The proportion of remaining methoxy groups were determined to be 2.6 weight % by the IR spectrum measurement. As these examination results, the average compositional formula of Siloxane Resin E can be represented by $(CH_3)_{1.0}Si(OCH_3)_{0.06}(OH)_{0.38}O_{1.28}$.

COMPARATIVE EXAMPLE 2

In a 5-liter flask were placed 408.8 g (3.0 moles) of methyltrimethoxysilane and 450 g of toluene. Thereto, 11.1 g of 98% methanesulfonic acid was added as a catalyst, and further 97.2 g (5.4 moles) of water was added dropwise while maintaining the inside temperature below 30° C., thereby hydrolyzing the aforesaid alkoxysilane. After the conclusion of the addition, the stirring was continued for 2 hours at room temperature to complete the hydrolysis reaction. Thereafter, the acid component was neutralized, and the methanol produced was distilled away under reduced pressure. The resulting solution was concentrated to a dense liquid having a solids content of 31.1%, and thereby 646 g of a toluene solution of the intended product (Siloxane Resin F).

The Siloxane Resin F obtained had a number average molecular weight (Mn) of $9.4 \times 10^2$, and the total $R^1SiO_{3/2}$ units therein comprised 18 mole % of T-2 units and 82 mole % of T-3 units. The proportion of remaining methoxy groups were determined to be 2.7 weight % by the IR spectrum measurement. As these examination results, the average compositional formula of Siloxane Resin F can be represented by $(CH_3)_{1.0}Si(OCH_3)_{0.06}(OH)_{0.12}O_{1.41}$.

EXAMPLES 5 TO 8 AND COMPARATIVE EXAMPLES 3 AND 4

Each of the resin solutions obtained in Examples 1 to 4 and Comparative Examples 1 and 2 was admixed with aluminum acetylacetate in a proportion of 0.05 weight % to the siloxane resin content therein, thereby preparing a coating composition. Each coating composition thus obtained was coated on a polished steel plate, cured at 150° C. for 1 hour to form a coat. The physical properties of the thus formed coats were each evaluated by the methods described below. In Table 1 are shown the average compositional formula of each resin, the proportion of T-2 units to the total $R^1SiO_{3/2}$ units in each resin, the number average molecular weight of each resin, and the physical properties of each cured coat. Additionally, each cured coat had a thickness of the order of 10–15 μm.

Evaluation Methods

1) Pencil Hardness

In accordance with JIS K-5400, §8.4.2, a coat is formed by applying a coating composition sample to a polished steel plate and then curing it. The curing herein is carried out at 150° C. for 1 hour. Some of pencils having various hardness (from 9H to 6B) are each pressed strongly to the coat at an angle of 45 degrees and moved forward as a constant force is applied thereon, thereby examining whether or not a groove is formed in the cured coat. The hardness of each cured coat is evaluated by the hardness of the softest pencil among the pencils which can form a groove.

2) Adhesiveness

In accordance with JIS K-5400, §6.15, each cured coat sample is cut crosswise with a knife to form 11 grooves at height of 30 cm onto a sample coat formed on a steel plate, thereby deforming the coat together with the substrate into a round shape. The evaluation is made by visual observation of cracks or peeling caused in the sample coat by the foregoing dropping operation. When neither crack nor peeling is observed in a sample coat, the impact resistance of the coat is represented by ○; while when some cracks or peeling is observed in a sample coat, the impact resistance of the coat is represented by X.

5) Storage Stability

A coating composition itself and a coat formed by applying a coating composition to a steel plate and then drying it are stored at 40° C. for one month, and the thus prepared samples are examined for an appearance change. When a considerable change is observed in the appearance of a sample, it is evaluated that the storage stability of the sample is bad.

TABLE 1

| | | Physical Properties of Cured Coat | | | | | | | | | |
|---|---|---|---|---|---|---|---|---|---|---|---|
| | Siloxane Resin | Proportion of Total $R^1SiO_{3/2}$ units (mole %) | Proportion of T-2 units (mole %) | SiOH content** (wt %) | Number Average Molecular weight (Mn) | Pencil Hardness | Adhesiveness | Bending Resistance | | Impact Resistance | Storage Stability |
| | | | | | | | | 8 mm | 2 mm | | |
| Example 5 | A | 100 | 41.6 | 10.8 | $1.8 \times 10^3$ | 9H | 100/100 | ○ | ○ | ○ | good |
| Example 6 | B | 75 | 39.0 | 7.8 | $1.5 \times 10^3$ | 7H | 100/100 | ○ | ○ | ○ | good |
| Example 7 | C | 93 | 42.0 | 8.8 | $2.1 \times 10^3$ | 6H | 100/100 | ○ | ○ | ○ | good |
| Example 8 | D | 100 | 54.0 | 5.3 | $1.1 \times 10^3$ | 9H | 100/100 | ○ | ○ | ○ | good |
| Comp. Ex. 3 | E | 100 | 32.0 | 9.0 | $4.2 \times 10^2$ | 9H | 100/100 | X | X | X | bad |
| Comp. Ex. 4 | F | 100 | 18.0 | 2.9 | $9.4 \times 10^2$ | 3H | 100/100 | Δ | X | X | good |

**value calculated from $^{29}$Si NMR Spectrum 1 mm-intervals in each of length and breadth directions, and thereto an adhesive tape (Cellotape, trade name, produced by Nichiban Co., Ltd.) is applied. Then, the adhesive tape is peeled away therefrom, and the number of sections remaining unpeeled is examined to evaluate the adhesiveness of each sample.

3) Bending Resistance

In accordance with JIS K-5400, §8.1, each cured coat sample is loaded in a bending tester, and examined for cracking resistance by bending into a round shape. In bending a sample, each of two bars having diameters of 2 mm and 8 mm is used. The evaluation is made by visual observation of cracks or peeling caused in the sample by the foregoing bending operations. When neither crack nor peeling is observed in a sample, the bending resistance of the sample is represented by ○; while when some cracks or peeling is observed in a sample, the bending resistance of the sample is represented by X.

4) Impact Resistance

In accordance with JIS K-5400, §8.3.2, a Du Pont impact deformation tester is used, and a weight is dropped from a

EXAMPLE 9 AND COMPARATIVE EXAMPLE 5

The resin solutions prepared in Example 1 and Comparative Examples 1 and 2 were each applied to three separate polished steel plates. Each group of resin coats thus formed were cured at different temperatures, 105° C., 150° C. and 200° C., respectively, and examined for physical properties (including appearance, pencil hardness, adhesiveness, bending resistance and solvent resistance). The evaluation results of these physical properties are shown in Table 2. Additionally, the thickness of every cured coat was in the range of 10 to 15 μm. In the curing, no curing catalyst was used.

As for the solvent resistance of each cured coat sample, the evaluation thereof was made by rubbing the surface of a cured coat sample with sanitary cotton impregnated with xylene as the extent of a change caused thereby in the surface appearance was observed. Additionally, each figure on the column corresponding to the solvent resistance in Table 2 is the number of times for which the rubbing of the coat surface is repeated until elution of the coat begins.

TABLE 2

| Curing Temp. | Properties | Example 5 Resin Soln. A | Comp. Ex.3 Resin Soln. E | Comp. Ex.4 Resin Soln. F |
|---|---|---|---|---|
| 105° C. | Appearance | good | good | good (with tack) |
| | Pencil Hardness | 2H | H | 2B |
| | Adhesiveness | 100/100 | 100/100 | 100/100 |

TABLE 2-continued

| Curing Temp. | Properties | Example 5 Resin Soln. A | Comp. Ex.3 Resin Soln. E | Comp. Ex.4 Resin Soln. F |
|---|---|---|---|---|
| | Bending Resistance 2 mmφ | ○ | X | ○ |
| | Solvent Resistance | 100< | 100< | 20 |
| 150° C. | Appearance | good | good | good |
| | Pencil Hardness | 8H | 8H | 2H |
| | Adhesiveness | 100/100 | 40/100 | 100/100 |
| | Bending Resistance 2 mmφ | ○ | X | X |
| | Solvent Resistance | 100< | 100< | 100< |
| 200° C. | Appearance | good | cracked | cracked |
| | Pencil Hardness | 9H | 9H | 9H |
| | Adhesiveness | 100/100 | 0/100 | 100/100 |
| | Bending Resistance 8 mmφ | ○ | X | X |
| | Solvent Resistance | 100< | 100< | 100< |

COMPARATIVE EXAMPLE 6 (ORGANIC SOLVENT)

In a 2-liter flask, 400 g of water and 414 g of toluene were placed and stirred at room temperature. Thereto, 299 g (2.0 mol) of methyltrichlorosilane was added dropwise over a period of 2 hours. During the addition, the temperature inside the flask was raised to about 100° C. due to the progress of hydrolysis. The stirring was continued for additional 4 hours without cooling the reaction system to complete the reaction. Upon standing, the reaction solution separated into two layers, namely a toluene layer containing a siloxane resin as the upper layer and a water layer containing hydrochloric acid as the lower layer. After the lower layer was removed, the upper layer was neutralized and rinsed twice with a weak alkaline water. Thus, a toluene solution of siloxane resin having a solid concentration of 23 weight % was obtained. In this solution, however, a large quantity of microgel was also present as by-product. The siloxane resin soluble in toluene was confirmed to have a number average molecular weight of $3.4 \times 10^3$ by GPC measurement and to have an average compositional formula $(CH_3)_{1.0} Si(OH)_{0.24} O_{1.38}$ by $^{29}Si$ NMR measurement.

COMPARATIVE EXAMPLE 7 (METHYL TRICHLORESILANE STARTING MATERIAL)

To 400 g of water placed in a 2-liter flask, 299 g (2.0 mol) of methyltrichlorosilane was added dropwise over a period of 2 hours while stirring at room temperature. With the progress of hydrolysis, the generation of gel was confirmed by visual observation.

COMPARATIVE EXAMPLE 8 (AMOUNT OF WATER)

In a 5-liter flask, 663 g of water and 884 g (6.5 mol) of methyltrimethoxysilane were placed and stirred at room temperature. Thereto, 16.7 g of a 1N water solution of hydrogen chloride was added dropwise over a period of 5 minutes. During the addition, the temperature inside the flask was raised to about 61° C. due to the progress of hydrolysis. The stirring was continued for an additional 4 hours without cooling the reaction system to complete the reaction. Thereafter, the methanol produced by the hydrolysis was evaporated for removal at 60° C. for 3 hours under a reduced pressure of 30 mmHg. Thus, 381 g of methanol was removed. The thus-obtained solution was cloudy, and the adhesion of solids to the flask wall was observed. Upon standing, a nonfluid matter was sedimented. This sediment contained a large quantity of microgel insoluble in not only MIBK but also the other organic solvents, such as toluene, t-butyl alcohol, dipropyl ether, dibutyl ether and 1-pentanol. The MIBK-soluble component of the sediment was confirmed to have a number average molecular weight of $3.8 \times 10^3$ by GPC measurement and to have an average compositional formula $(CH_3)_{1.0} Si(OX)_{0.18} O_{1.41}$ by $^{29}Si$ NMR measurement (wherein X is a mixture of H and $CH_3$).

What is claimed is:

1. A method of producing an organopolysiloxane resin having a number average molecular weight of at least 500 and a silanol group content of at least 5 weight %, and comprising units of formula $R^1 SiO_{3/2}$, wherein $R^1$ represents a hydrogen atom or a monovalent substituted or unsubstituted hydrocarbon group having 1 to 18 carbon atoms, in a proportion of 30 to 100 mole %, said units of formula $R^1 SiO_{3/2}$ including 30–80 mole % of one silanol group-containing units of formula $R^1 Si(OH)O_{2/2}$, wherein said monovalent substituted or unsubstituted hydrocarbon group is selected from the group consisting of:
a) unsubstituted alkyl groups, alkenyl groups and cycloalkyl groups,
b) halo substituted alkyl groups and cycloalkyl groups,
c) epoxy substituted alkyl groups, alkenyl groups and cycloalkyl groups,
d) amino substituted alkyl groups, alkenyl groups and cycloalkyl groups,
e) (meth)acrylic substituted alkyl groups, alkenyl groups and cycloalkyl groups,
f) sulfur containing alkyl groups, alkenyl groups and cycloalkyl groups,
g) alkyl ether substituted alkyl groups, alkenyl groups and cycloalkyl groups,
h) carboxyl substituted alkyl groups, alkenyl groups and cycloalkyl groups, and
i) alkyl, alkenyl and cycloalkyl groups substituted by quaternary ammonium salts, said method comprising:

(1) a step of hydrolyzing an organosilicon compound represented by $R^1SiX_3$, where $R^1$ is as defined above and X is an alkoxy group, in a water solution having a pH value of 1–7 containing no organic solvent, and (2) a step of subjecting the organosilicon compound hydrolyzed in the step (1) to condensation reaction, wherein the amount of water used in step (1) is from 10 to 500 parts by weight per 10 parts by weight of the organosilicon compound.

2. A method as in claim 1, wherein the organopolysiloxane resin produced is free of alkoxy groups.

3. A method as in claim 1, wherein the monovalent hydrocarbon group represented by $R^1$ of the organopolysiloxane resin produced is an unsubstituted alkyl group or an alkyl group substituted with an epoxy functional group.

4. A method as in claim 1, wherein the proportion of units of formula $R^1SiO_{3/2}$ in the organopolysiloxane produced is from 40 to 100 mole %.

5. A method as in claim 1, wherein 35–70 mol. % of the units of formula $R^1SiO_{3/2}$ within the organopolysiloxane resin produced are one silanol group containing units of formula $R^1Si(OH)O_{2/2}$.

6. A method as in claim 1, further comprising (3), a step of isolating the condensation product by extraction with an organic solvent slightly soluble in water.

7. A method as in claim 1, wherein $R^1$ is methyl.

8. A method as in claim 1, wherein hydrolyzing an organosilicon compound of the formula $R^1SiX_3$ is performed without heating.

9. A method of preparing a curable organopolysiloxane resin composition which comprises preparing an organopolysiloxane resin in accordance with the method described in claim 1, and combining the organopolysiloxane resin produced with water, an organic solvent or a mixture of water with an organic solvent.

10. A method as in claim 9, wherein the organic solvent is a ketone, an alcohol, an ether or an ester.

11. A method as in claim 9, which further comprises incorporating a curing catalyst in the curable organopolysiloxane resin composition produced.

12. A method as in claim 11, wherein the curable organopolysiloxane resin composition produced contains an amount of curing catalyst of from 0.01 to 10 parts by weight per 100 parts by weight of the organopolysiloxane resin within said curable organosiloxane resin composition.

13. A method as in claim 1, wherein the organopolysiloxane resin produced has a number average molecular weight between 1,000 and 10,000.

14. The method described in claim 1, wherein the water solution has a pH value of 2–5 and contains no organic solvent.

15. The method described in claim 1, wherein the step (1) is performed in the presence of a hydrolysis catalyst.

16. The method described in claim 15, wherein the hydrolysis catalyst is hydrogen fluoride, hydrochloric acid, nitric acid, acetic acid, maleic acid, methanesulfonic acid or an ion exchange resin having carboxylic or sulfonic acid groups at the surface.

17. The method described in claim 1, wherein the condensation reaction is performed at a temperature ranging from room temperature to 80° C.

18. A method of producing an organopolysiloxane resin having a number average molecular weight of at least 500 and a silanol group content of at least 5 wt. % and comprising the units of formula $R^1SiO_{3/2}$, wherein $R^1$ represents a hydrogen atom or a monovalent substituted or unsubstituted hydrocarbon group having 1–8 carbon atoms, in a proportion of 30 to 100 mol. %, said units of formula $R^1SiO_{3/2}$, including 30 to 80 mol. % of one silanol group containing units of formula $R^1Si(OH)O_{2/2}$, wherein said monovalent substituted or unsubstituted hydrocarbon group is selected from the group consisting of a) unsubstituted alkyl groups, alkenyl groups and cycloalkyl groups, b) halo substituted alkyl groups and cycloalkyl groups, c) epoxy substituted alkyl groups, alkenyl groups and cycloalkyl groups, d) amino substituted alkyl groups, alkenyl groups and cycloalkyl groups, e) (meth)acrylic substituted alkyl groups, alkenyl groups and cycloalkyl groups, f) sulfur containing alkyl groups, alkenyl groups and cycloalkyl groups, g) alkyl ether substituted alkyl groups, alkenyl groups and cycloalkyl groups, h) carboxyl substituted alkyl groups, alkenyl groups and cycloalkyl groups, and i) alkyl, alkenyl and cycloalkyl groups substituted by quaternary ammonium salts, said method comprising:

(1) hydrolyzing an organosilicon compound represented by $R^1SiX_3$, wherein $R^1$ represents a hydrogen atom or a monovalent substituted or unsubstituted hydrocarbon group having 1 to 18 carbon atoms and X is an alkoxy group, in a water solution having a pH of a 1–7; and (2) subjecting the hydrolyzed organosilicon compound to a condensation reaction.

* * * * *